US011775087B2

(12) United States Patent
Lin et al.

(10) Patent No.: US 11,775,087 B2
(45) Date of Patent: Oct. 3, 2023

(54) ELECTRONIC DEVICE AND TOUCH OPERATION METHOD FOR THE SAME

(71) Applicant: ASUSTeK COMPUTER INC., Taipei (TW)

(72) Inventors: Wei Tong Lin, Taipei (TW); Chun-Tsai Yeh, Taipei (TW); Wen-Yun Liu, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 17/701,708

(22) Filed: Mar. 23, 2022

(65) Prior Publication Data

US 2022/0317789 A1 Oct. 6, 2022

(30) Foreign Application Priority Data

Mar. 31, 2021 (CN) .......................... 202110352521.3

(51) Int. Cl.
| | | |
|---|---|---|
| *G06F 3/0354* | (2013.01) | |
| *G06F 3/038* | (2013.01) | |
| *G06F 3/041* | (2006.01) | |

(52) U.S. Cl.
CPC ........ *G06F 3/03547* (2013.01); *G06F 3/0383* (2013.01); *G06F 3/0416* (2013.01)

(58) Field of Classification Search
CPC ... G06F 3/03547; G06F 3/0383; G06F 3/0416
See application file for complete search history.

(56) References Cited

U.S. PATENT DOCUMENTS

| | | | | |
|---|---|---|---|---|
| 2012/0120000 A1* | 5/2012 | Lucic | .................. | G06F 3/04886 345/173 |
| 2012/0124526 A1 | 5/2012 | Lin et al. | | |
| 2012/0299852 A1* | 11/2012 | Hsu | ..................... | G06F 3/04883 345/173 |
| 2013/0321288 A1* | 12/2013 | Adamson | .............. | G06F 1/1616 345/173 |
| 2014/0306889 A1* | 10/2014 | Kresl | ...................... | G06F 3/042 345/157 |
| 2014/0380206 A1* | 12/2014 | Dickie | ................ | G06F 3/04883 715/762 |

(Continued)

FOREIGN PATENT DOCUMENTS

| | | |
|---|---|---|
| CN | 1949155 | 4/2010 |
| CN | 103123551 | 5/2013 |

(Continued)

*Primary Examiner* — Ryan A Lubit
(74) *Attorney, Agent, or Firm* — JCIPRNET

(57) ABSTRACT

In the touch operation method, a touch signal is generated in response to a touch operation performed on the touchpad, whether the touch operation is located in at least one predetermined region of the touchpad is determined according to the touch signal, and when the touch operation is located in the predetermined region, whether there is a displacement of the touch operation in a preset time interval is determined according to the touch signal. When it is determined that there is a displacement of the touch operation in the preset time interval, an operation signal corresponding to a predetermined function of the electronic device is generated according to the displacement of the touch operation, to perform the predetermined function.

6 Claims, 7 Drawing Sheets

(56) References Cited

U.S. PATENT DOCUMENTS

| | | | | |
|---|---|---|---|---|
| 2016/0062636 A1* | 3/2016 | Jung | .................. | G06F 3/04817 |
| | | | | 715/762 |
| 2016/0188181 A1* | 6/2016 | Smith | .................. | G06F 3/0412 |
| | | | | 715/765 |
| 2019/0065045 A1* | 2/2019 | Gong | .................. | G06F 3/04892 |

FOREIGN PATENT DOCUMENTS

| | | |
|---|---|---|
| CN | 107797704 | 3/2018 |
| CN | 108182028 | 6/2018 |
| CN | 108932057 | 12/2018 |
| CN | 108958627 | 12/2018 |

* cited by examiner

ELECTRONIC DEVICE AND TOUCH OPERATION METHOD FOR THE SAME

CROSS-REFERENCE TO RELATED APPLICATION

This application claims the priority benefit of China application serial No. 202110352521.3, filed on Mar. 31, 2021. The entirety of the above-mentioned patent application is hereby incorporated by reference herein and made a part of the specification.

BACKGROUND OF THE INVENTION

Field of the Invention

The disclosure relates to an electronic device and an operation method for the same, and in particular, to an electronic device and a touch operation method for the same.

Description of the Related Art

In recent years, notebook computers have become considerably popular. To help a user operate a notebook computer, in addition to a conventional keyboard, a touchpad is configured for the notebook computer, to enable the user to correspondingly perform operation functions such as tapping and dragging on the notebook computer by performing touch operations such as click, press, and slide on the touchpad. With the advancement and innovation of touch technologies, a plurality of notebook computers is configured with large-sized touchpads and supports multi-point touch. Based on this, an operable region of the user's fingers is enlarged, and the user implements various touch functions by performing gestures such as sliding, pinching, and spreading with two fingers or flipping with several fingers.

However, the large-sized touchpad relatively occupies a space of the notebook computer. If the function of the touchpad is only limited to general touch detection, the space is wasted, and the large-sized touchpad is not advantageously used.

BRIEF SUMMARY OF THE INVENTION

According to the first aspect, a touch operation method for an electronic device is provided, and the method is applicable to an electronic device including a touchpad and a processor. The method includes the following steps: generating a touch signal in response to a touch operation performed on the touchpad; determining, according to the touch signal, whether the touch operation is located in at least one predetermined region of the touchpad; when it is determined that the touch operation is located in the predetermined region, determining, according to the touch signal, whether there is a displacement of the touch operation in a first preset time interval; and when it is determined that there is a displacement of the touch operation in the first preset time interval, generating an operation signal corresponding to a predetermined function of the electronic device according to the displacement of the touch operation, to perform the predetermined function.

According to the second aspect, an electronic device is provided. The electronic device includes a touchpad, a storage device, and a processor. The storage device is configured to store a computer module. The processor is coupled to the touchpad and the storage device, and is configured to: generate a touch signal in response to a touch operation performed on the touchpad; determine whether the touch operation is located in at least one predetermined region of the touchpad according to the touch signal; when it is determined that the touch operation is located in the predetermined region, determine whether there is a displacement of the touch operation in a first preset time interval according to the touch signal; and when it is determined that there is a displacement of the touch operation in the first preset time interval, generate an operation signal corresponding to a predetermined function of the electronic device according to the displacement of the touch operation, to perform the predetermined function.

Based on the above, according to the electronic device and the touch operation method for the same in the invention, the touch operation in the predetermined region of the touchpad is detected, and operations such as short press, long press, release, clockwise rotation, and counterclockwise rotation are correspondingly performed according to parameters such as a touch time, a displacement, and a direction of the detected touch operation, so that operations of a radial controller are simulated, or movement of a touch mapping region is performed, thereby helping a user adjust an operation region of a stylus on a screen. In this way, diversity of the touch operations performed on the touchpad is improved.

To make the disclosure more comprehensible, detailed descriptions are given below by using embodiments with reference to accompanying drawings.

DETAILED DESCRIPTION OF THE EMBODIMENTS

By observing operation behaviors of a user performed on a large-sized touchpad, it is found that operation actions of the user are mostly performed in a central region of the touchpad, and there are many regions less or not used, such as a predetermined region located on the touchpad. In the embodiments of the invention, such regions are used to detect and analyze a touch operation of the user, to simulate operations of a radial controller or movement of a stylus in a touch mapping region of a screen, thereby improving diversity of the touch operations performed on the touchpad.

Figure 1:
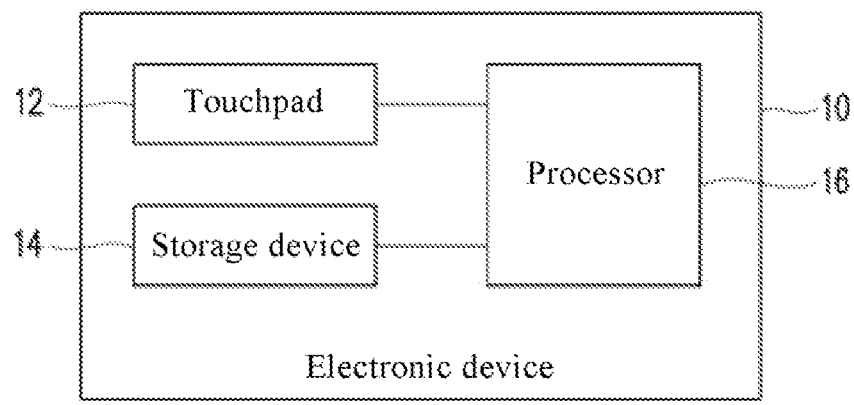
FIG. 1 is a block diagram of an electronic device according to an embodiment of the invention.

Referring to FIG. 1, an electronic device 10 in this embodiment includes a touchpad 12, a storage device 14, and a processor 16. The electronic device 10 is, in an embodiment, a device using the touchpad 12 as an input tool, such as a notebook computer, a desktop computer, a tablet computer, or an on-board computer.

In an embodiment, the touchpad 12 includes, a touch detection component of a resistive type, a capacitive type, an optical type, or another type. The touch detection component detects a touch operation of the user's fingers or the stylus.

In an embodiment, the storage device 14 is any type of fixed or removable random access memory (RAM), a read-only memory (ROM), a flash memory, a hard disk, a similar device, or a combination of the foregoing devices, and is configured to store a computer module executable by the processor 16.

In an embodiment, the storage device 14 records a computer module configured to perform a touch operation method for an electronic device in the embodiments of the disclosure. In an embodiment, the computer module is a touchpad driver module mounted on the touchpad 12. The touchpad driver module is configured to run a scrollbar algorithm, and is connected to other devices for operation. Specifically, in an embodiment, the touchpad driver module generates an operation signal corresponding to a predetermined function of the electronic device according to a touch signal generated by the touchpad 12 in response to the touch operation of the user performed on the touchpad 12, so that in addition to basic touch functions, the touchpad 12 further implements functions of another external device. The foregoing external device is, in an embodiment, a radial controller device. The foregoing external device performs, in an embodiment, operation functions such as short press, long press, release, clockwise rotation, and counterclockwise rotation provided by the radial controller device.

Figure 2:
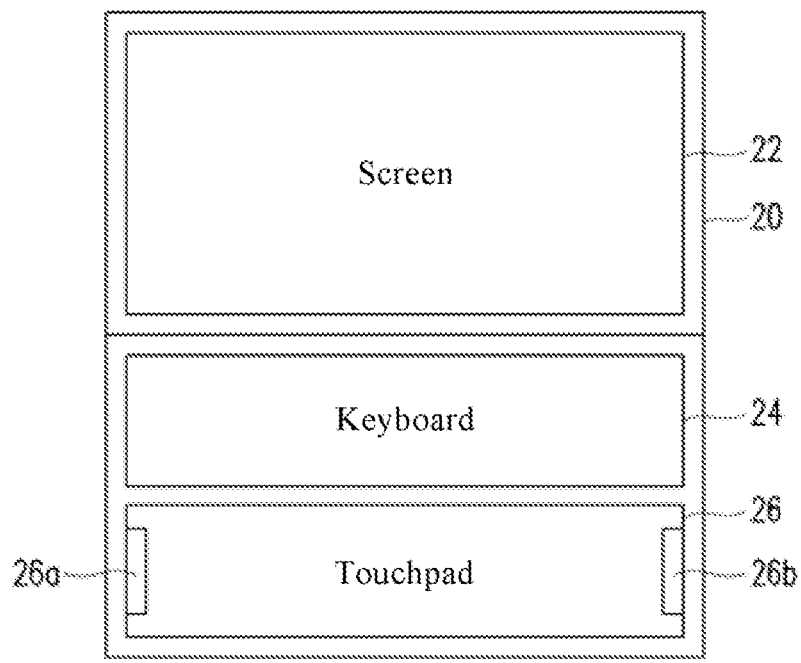
FIG. 2 shows an example of an electronic device including a touchpad according to an embodiment of the invention.

Referring to FIG. 2, in an embodiment, an electronic device 20 is a notebook computer including a screen 22, a keyboard 24, and a touchpad 26.

In some embodiments, when the touch operation of the fingers is detected by the touchpad 26, a driver module of the touchpad 26 generates a touch signal and transmits the touch signal to an inter-integrated circuit (I2C) controller driver module of the electronic device 20, and the I2C controller driver module uploads touch data to an operating system of the electronic device 20 sequentially through a human interface device (HID) I2C controller driver module and an HID category driver module, to perform corresponding functions.

In an embodiment, the processor 16 is connect to the touchpad 12 and the storage device 14. The processor 16 is a central processing unit (CPU) or another modular general-purpose or special-purpose microprocessor, a microcontroller, a digital signal processor (DSP), a modular controller, an application-specific integrated circuit (ASIC), a programmable logic device (PLD), another similar device, or a combination of such devices. In this embodiment, the processor 16 loads the computer module from the storage device 14, to perform the touch operation method for the electronic device 10 in this embodiment of the disclosure.

Figure 3:
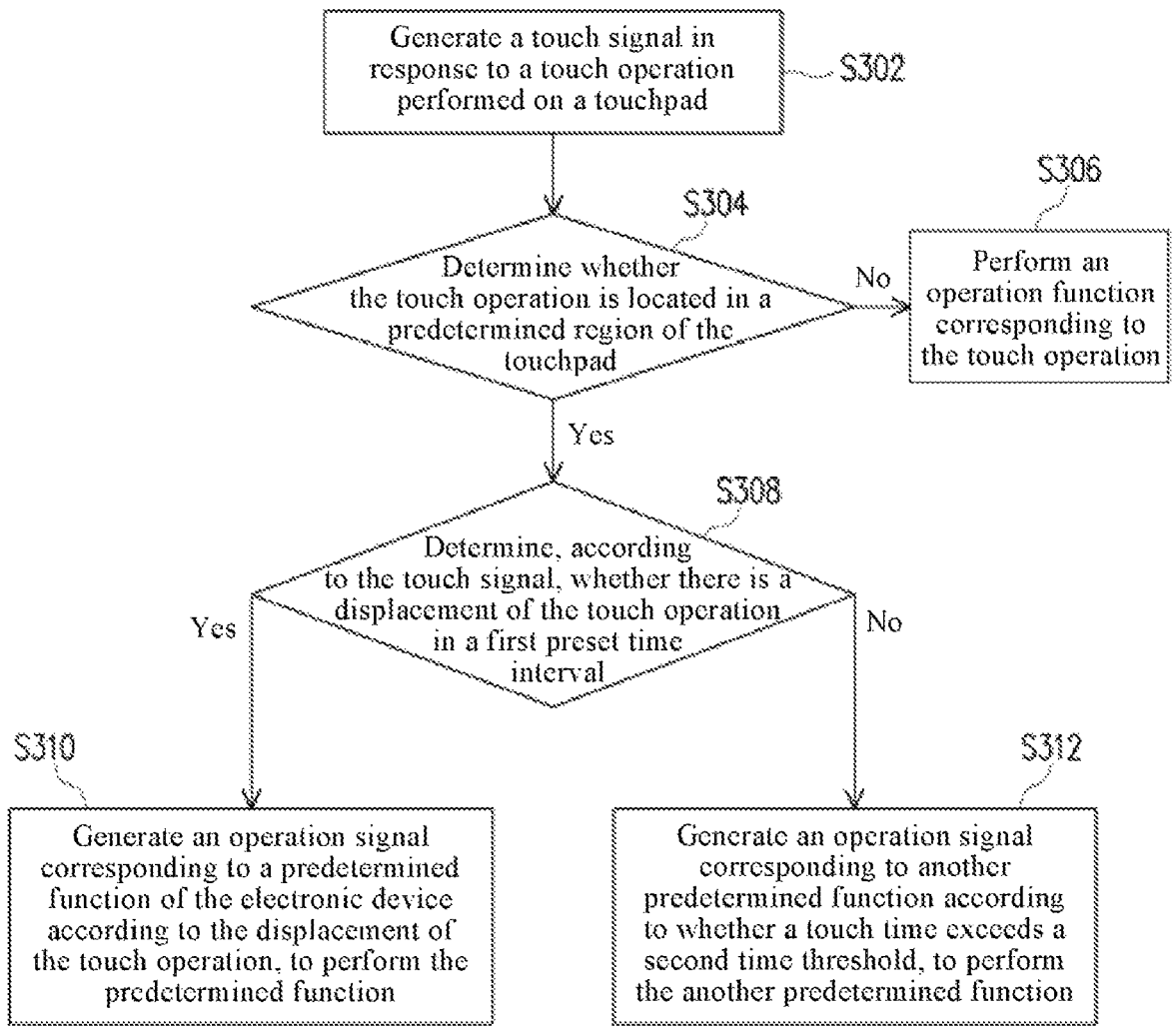
FIG. 3 is a flowchart of a touch operation method for an electronic device according to an embodiment of the disclosure.

Specifically, referring to FIG. 1 and FIG. 3 together, the method in this embodiment is applicable to the foregoing electronic device 10. A detailed procedure of the method in this embodiment is described below with reference to various components of the electronic device 10 shown in FIG. 1.

In step S302, the touchpad 12 generates a touch signal in response to a touch operation of a user performed on the touchpad 12. In step S304, the processor 16 determines, according to the touch signal received from the touchpad 12, whether the touch operation is located in a predetermined region of the touchpad 12. When it is determined that the touch operation is not located in the predetermined region, in step S306, the processor 16 performs an operation function corresponding to the touch operation. Only when it is determined that the touch operation is located in the predetermined region, the processor 16 determines subsequent touch time and displacement.

When it is determined that the touch operation is located in the predetermined region, in step S308, the processor 16 determines whether there is a displacement of the touch operation in a first preset time interval according to the touch signal.

When the processor 16 determines that there is a displacement of the touch operation in the first preset time interval, in step S310, the processor 16 generates an operation signal corresponding to a predetermined function of the electronic device according to the displacement of the touch operation, to perform the predetermined function.

In some embodiments, the processor 16 determines a corresponding predetermined function according to a value and a direction of the displacement of the touch operation. In an embodiment, the processor 16 determines whether the displacement of the touch operation in the first preset time interval exceeds a displacement threshold in a first direction or a second direction. In an embodiment, the first direction and the second direction are opposite directions such as upper and lower, or left and right. The displacement threshold is, in an embodiment, any value greater than 0. The processor 16 generates an operation signal corresponding to a first function of the electronic device 10 when it is determined that the displacement of the touch operation exceeds the displacement threshold in the first direction. The processor 16 generates an operation signal corresponding to a second function of the electronic device when it is determined that the displacement of the touch operation exceeds the displacement threshold in the second direction. The first function and the second function are, in an embodiment, functions opposite to each other such as clockwise rotation and counterclockwise rotation, or moving upward and moving downward.

According to another aspect, in step S308, when the processor 16 determines that there is no displacement of the touch operation in the first preset time interval, in step S312, the processor 16 determines whether a touch time exceeds a second time threshold, to perform another predetermined function. The second time threshold is greater than the foregoing first preset time interval, and is, in an embodiment, any value in a range of 1 second to 10 seconds. The processor 16 generates an operation signal corresponding to a fourth function of the electronic device 10 when the touch time does not exceed the second time threshold. The processor 16 generates an operation signal corresponding to a fifth function of the electronic device 10 when the touch time exceeds the second time threshold. The fourth function and the fifth function are, in an embodiment, functions with different operation times, such as short press and long press.

In the foregoing touch operation method, the electronic device 10 of the disclosure implements a plurality of functions of another external device according to a plurality of touch operations performed in the predetermined region of the touchpad 12, to improve the diversity of the touch operations performed on the touchpad. The following is described in detail with reference to embodiments.

Figure 4:
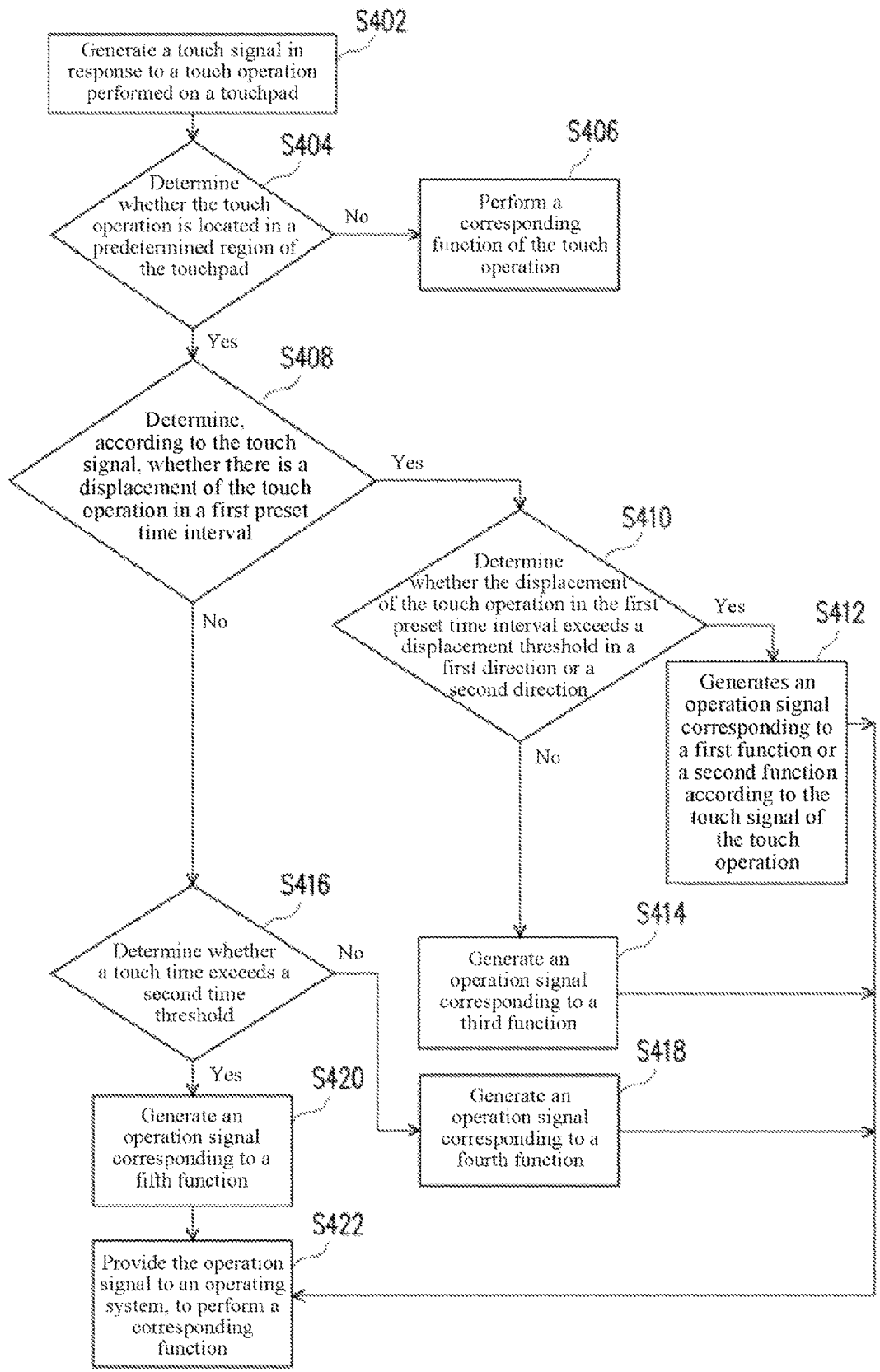
FIG. 4 is a flowchart of a touch operation method for an electronic device according to an embodiment of the disclosure.

Referring to FIG. 1 and FIG. 4 together, the method in this embodiment is applicable to the foregoing electronic device 10. A detailed procedure of the method in this embodiment is described below with reference to various components of the electronic device 10 shown in FIG. 1.

In step S402, the touchpad 12 generates a touch signal in response to a touch operation of a user performed on the touchpad 12. In step S404, the processor 16 determines, according to the touch signal received from the touchpad 12, whether the touch operation is located in a predetermined region of the touchpad 12. When it is determined that the touch operation is not located in the predetermined region, in step S406, the processor 16 performs a function corresponding to the touch operation. Only when it is determined that the touch operation is located in the predetermined region, the processor 16 determines subsequent touch time and displacement.

When it is determined that the touch operation is located in the predetermined region, in step S408, the processor 16 determines, according to the touch signal, whether there is a displacement of the touch operation in a first preset time interval. The first preset time interval is, in an embodiment, any value in a range of 0.1 seconds to 2 seconds.

When the processor 16 determines that there is a displacement of the touch operation in the first preset time interval, in step S410, the processor 16 determines whether the displacement of the touch operation exceeds a displacement threshold in a first direction or a second direction. The first direction and the second direction are, in an embodiment, opposite directions such as upper and lower, or left and right. The displacement threshold is, in an embodiment, any value greater than 0.

In step S410, when the processor 16 determines that the touch operation exceeds the displacement threshold in the first direction or the second direction, in step S412, the processor 16 generates the operation signal corresponding to the first function or the second function according to the touch signal of the touch operation. In some embodiments, the foregoing first function is the clockwise rotation or moving upward. In an embodiment, the foregoing second function is, the counterclockwise rotation or moving downward. The processor 16 converts the touch signal into an operation signal of a corresponding function according to the displacement of the touch operation in the first direction or the second direction. In an embodiment, when the displacement of the touch operation in the first direction is upward, an operation signal corresponding to clockwise rotation of the radial controller is generated according to the touch signal; and when the displacement of the touch operation in the second direction is downward, an operation signal corresponding to counterclockwise rotation of the radial controller is generated according to the touch signal.

In step S410, when the processor 16 determines that the displacements of the touch operation do not exceed the displacement threshold in the first direction and the second direction, in step S414, the processor 16 generates an operation signal corresponding to a third function according to the touch signal of the touch operation. The third function is, in an embodiment, a developer-defined function.

According to another aspect, in step S408, when the processor 16 determines, that there is no displacement of the touch operation in the first preset time interval according to the touch signal the processor 16 further determines whether a touch time of the touch operation exceeds a second time threshold in step S416. The second time threshold is greater than the foregoing first preset time interval, and is, in an embodiment, any value in a range of 1 second to 10 seconds.

When the processor 16 determines that the touch time of the touch operation does not exceed the second time threshold, in step S418, the processor 16 generates an operation signal corresponding to a fourth function according to the touch signal of the touch operation. On the contrary, when the processor 16 determines that the touch time of the touch operation exceeds the second time threshold, in step S420, the processor 16 generates an operation signal corresponding to a fifth function according to the touch signal of the touch operation. In an embodiment, the fourth function corresponds to a short-press operation of the radial controller, and the fifth function corresponds to a long-press operation of the radial controller. In step S422, the processor 16 provides the operation signal to an operating system, to perform a function corresponding to the operation signal.

Figure 5:
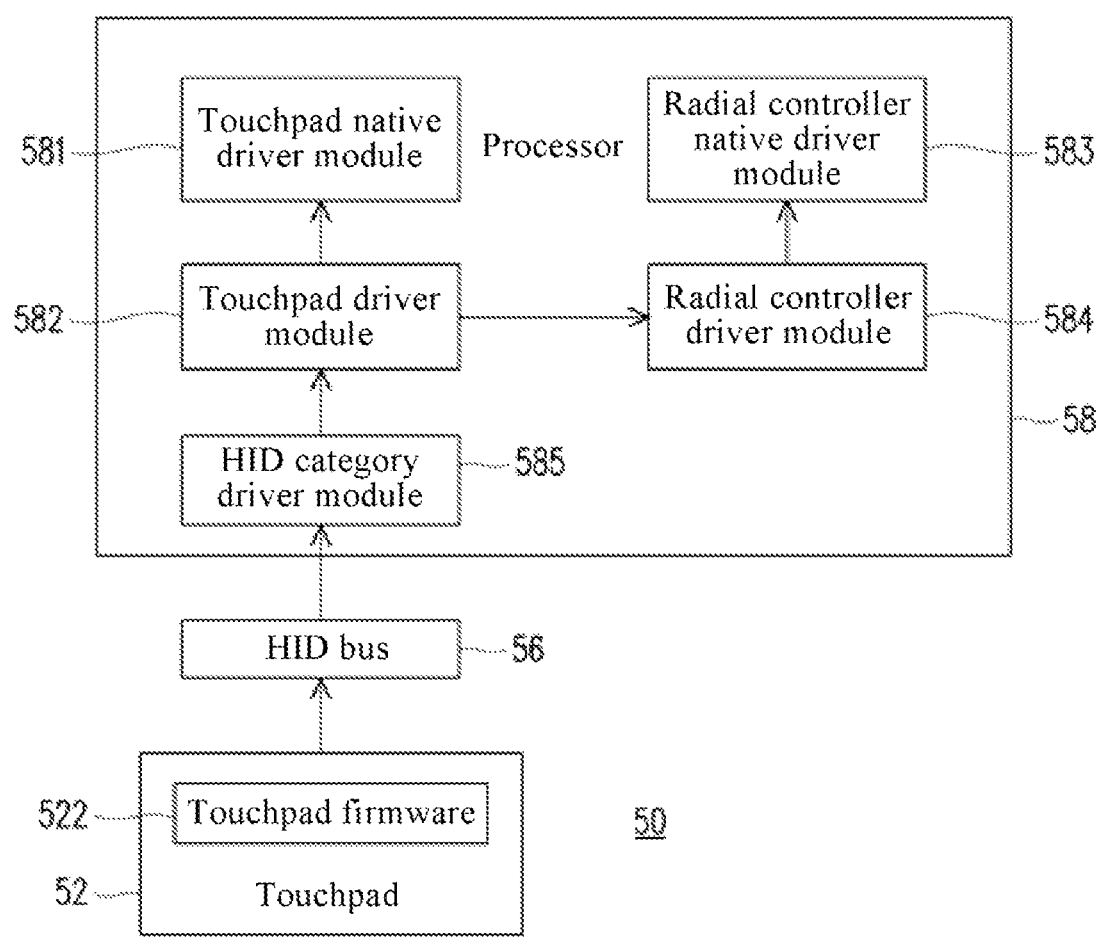
FIG. 5 is a system architecture diagram of an electronic device according to an embodiment of the disclosure.

Specifically, referring to FIG. 5, this embodiment illustrates a procedure of using a touchpad 52 by internal software of an electronic device 50 to simulate an operation of a radial controller 4. The electronic device 50 includes the touchpad 52, an HID bus 56, and a processor 58.

Touchpad firmware 522, in an embodiment, is mounted on the touchpad 52. A system architecture of the processor 58 includes a touchpad native driver module 581, a touchpad driver module 582, a radial controller native driver module 583, a radial controller driver module 584, and an HID category driver module 585.

The touchpad driver module 582 is connected with the touchpad native driver module 581 and the HID category driver module 585, and is connected with the touchpad firmware 522 of the touchpad 52 by using the HID bus 56, so that a touch signal sensed by the touchpad firmware 522 is transmitted to the touchpad native driver module 581 by using the HID bus 56 and the touchpad driver module 582, to perform a corresponding touchpad function.

In an embodiment, according to the foregoing touch operation method, the touchpad driver module 582 generates an operation signal corresponding to a predetermined function of the radial controller according to the touch signal sensed by the touchpad firmware 522 and transmits the operation signal to the radial controller driver module 584, and the radial controller driver module 584 generates a corresponding function packet according to the operation signal and transmits the function packet to the radial controller native driver module 583, to implement a corresponding predetermined function (that is, completing simulation of operation functions of the radial controller) by the radial controller native driver module 583. The function packet is in a data format readable by the radial controller native driver module 583.

According to the foregoing touch operation method, the operation functions of the radial controller such as short press, long press, release, clockwise rotation, and counterclockwise rotation provided by the touchpad 12 are used by the electronic device 10 in this embodiment of the invention, to improve diversity of the touch operations performed on the touchpad.

Figure 6:
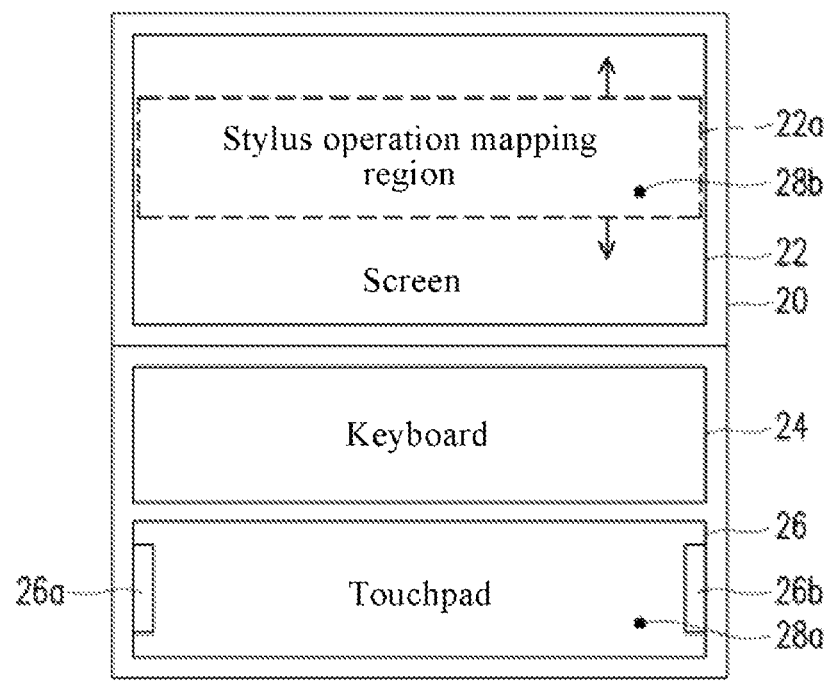
FIG. 6 is a schematic diagram of an adjustment function of a stylus operation mapping region according to an embodiment of the disclosure.

Referring to FIG. 6, an adjustment function of a stylus operation mapping region is described in this embodiment by using the electronic device 20 in FIG. 2 as an example.

Specifically, in some embodiments, different from an adjustment manner by using a stylus driver module, the electronic device 20 in this embodiment helps the user touch predetermined regions 26a and 26b of the touchpad 26 based on operations, to implement an adjustment function of a stylus operation mapping region 22a. In some embodiments, the stylus operation mapping region 22a is a corresponding region on the screen 22 to which a touch operation region of the stylus on the touchpad 26 is mapped. In other words, a touch operation of the stylus performed in the touch operation region is converted into a corresponding operation performed at a corresponding position in the stylus operation mapping region 22a on the screen 22.

Figure 7:
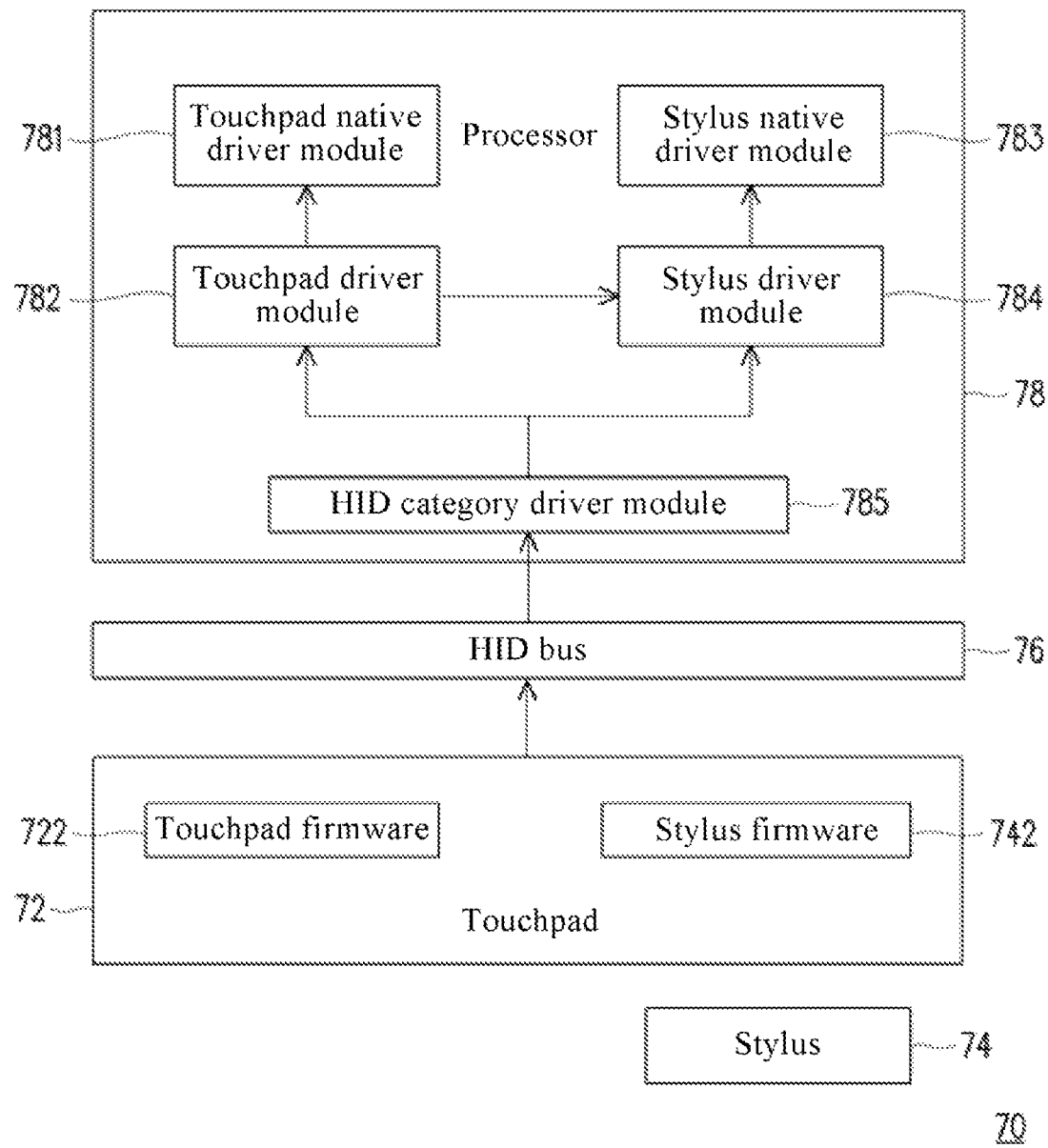
FIG. 7 is a system architecture diagram of an electronic device according to an embodiment of the disclosure.

Referring to FIG. 6 and FIG. 7, this embodiment illustrates a procedure of using a touchpad 72 by internal software of an electronic device 70 to simulate an adjustment function of a stylus 74 on an operation region of a screen of the electronic device 70. The electronic device 70 includes the touchpad 72, an HID bus 76, and a processor 78.

Touchpad firmware 722 and stylus firmware 742 are mounted on the touchpad 72. A system architecture of the processor 78 includes a touchpad native driver module 781, a touchpad driver module 782, a stylus native driver module 783, a stylus driver module 784, and an HID category driver module 785.

The touchpad driver module 782 is in a signal connection to the touchpad native driver module 781 and the HID category driver module 785, and is in a signal connection to the touchpad firmware 722 of the touchpad 72 by the HID bus 76, so that a touch signal sensed by the touchpad firmware 722 is transmitted to the touchpad native driver module 781 by using the HID bus 76 and the touchpad driver module 782, to perform a corresponding touchpad function.

The stylus driver module 784 is in a signal connection to the stylus native driver module 783 and the HID category driver module 785, and is in a signal connection to the stylus firmware 742 of the touchpad 72 by using the HID bus 76, so that an operation signal sensed by the stylus firmware 742 is transmitted to the stylus native driver module 783 by using the HID bus 76 and the stylus driver module 784, to perform a corresponding adjustment function of the stylus operation mapping region.

In an embodiment, according to the foregoing touch operation method, the touchpad driver module 782 generates an operation signal corresponding to an adjustment function of the stylus operation mapping region according to the touch signal sensed by the touchpad firmware 722 and transmits the operation signal to the stylus driver module 784, and the stylus driver module 784 generates a corresponding function packet according to the operation signal and transmits the function packet to the stylus native driver module 783, to implement a corresponding predetermined function (that is, completing an operation region adjustment behavior of the physical stylus 74) by using the stylus native driver module 783. The function packet is in a data format readable by the stylus native driver module 783. In some embodiments, the touchpad driver module 782 transmits a moving direction and distance of a to-be-adjusted stylus operation mapping region to the stylus driver module 784, to change the setting of a position of the stylus operation mapping region in the stylus driver module 784, thereby adjusting the stylus operation mapping region.

Figure 8:
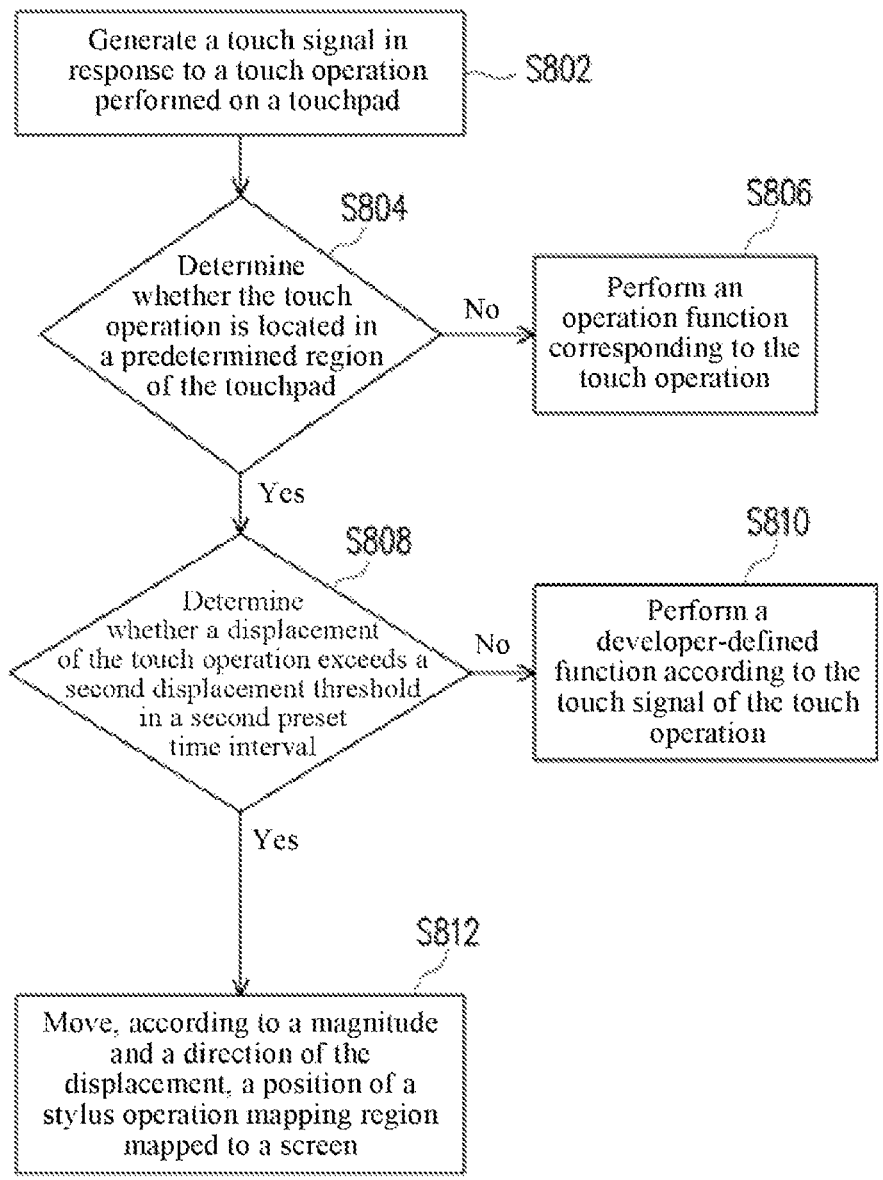
FIG. 8 is a flowchart of a touch operation method for an electronic device according to an embodiment of the disclosure.

Referring to FIG. 1, FIG. 6, and FIG. 8 together, the method in this embodiment is applicable to the foregoing electronic device 10. A detailed procedure of the method in this embodiment is described below with reference to various components of the electronic device 10 shown in FIG. 1.

In step S802, the touchpad 12 generates a touch signal in response to a touch operation of a user performed on the touchpad 12. In step S804, the processor 16 determines, whether the touch operation is located in a predetermined region of the touchpad 12 according to the touch signal received from the touchpad 12. When it is determined that the touch operation is not located in the predetermined region, in step S806, the processor 16 performs an operation function corresponding to the touch operation. Only when it is determined that the touch operation is located in the predetermined region, the processor 16 determines subsequent touch time and displacement.

when it is determined that the touch operation is not located in the predetermined region, in step S808, the processor 16 determines whether a displacement of the touch operation exceeds a second displacement threshold in a second preset time interval. In an embodiment, the second preset time interval is any value in a range of 1 second to 10 seconds.

In step S808, when the processor 16 determines that the touch operation does not exceed the second displacement threshold in the second preset time interval, in step S810, the processor 16 generates a developer-defined function according to the touch signal of the touch operation.

When the processor 16 determines that the displacement of the touch operation exceeds the second displacement threshold in the second preset time interval, in step S812, the processor 16 moves a position of the stylus operation mapping region 22a mapped to the screen 22 according to a magnitude and a direction of the displacement. In some embodiments, the stylus operation mapping region 22a is a corresponding region on the screen 22 to which a touch operation region of the stylus on the touchpad 26 is mapped. In other words, a touch operation of the stylus performed in the touch operation region is mapped to a corresponding position in a corresponding region on the screen 22, so that a corresponding operation is performed on the corresponding position. In an embodiment, the position of the stylus operation mapping region 22a is moved upward by a corresponding distance when the displacement direction of the touch operation is upward, and the position of the stylus operation mapping region 22a is moved downward by a corresponding distance when the displacement direction of the touch operation is downward. In some embodiments, the processor 16 transmits a moving direction and distance of a to-be-adjusted stylus operation mapping region 22a to the stylus driver module, to change the setting of a position of the stylus operation mapping region 22a in the stylus driver module, thereby adjusting the stylus operation mapping region 22a.

According to the foregoing touch operation method, the adjustment function of the stylus operation mapping region provided by the touchpad 12 is used by the electronic device 10 in this embodiment of the invention, to improve diversity of the touch operations performed on the touchpad.

Based on the above, according to the electronic device and the touch operation method for the same in the invention, a touch signal of a predetermined region on a touchpad is detected and analyzed, and touch operations are divided into various device operations according to a touch time, a displacement, and a direction of the touch signal. Therefore, in the invention, various operations of a radial controller are simulated and an operation region of a stylus on a screen is quickly adjusted without additionally configuring a hardware device or performing a cumbersome setting operation, so that the diversity of the touch operations performed on the touchpad is improved.

Although the disclosure has been disclosed with reference to the embodiments mentioned above, the embodiments are not intended to limit the disclosure. A person skilled in the art makes some modifications and improvements without departing from the spirit and scope of the disclosure. Therefore, the protection scope of the disclosure is subject to the appended claims and an equivalent scope thereof.

What is claimed is:

1. A touch operation method, applied to an electronic device including a touchpad and a processor, the touch operation method comprising the following steps:
    generating, by the touchpad, a touch signal in response to a touch operation performed on the touchpad;
    determining, by the processor, whether the touch operation is located in at least one predetermined region of the touchpad according to the touch signal;
    determining, by the processor, whether there is a displacement of the touch operation in a first preset time interval according to the touch signal when it is determined that the touch operation is located in the predetermined region; and
    generating, by the processor, an operation signal corresponding to a predetermined function of the electronic device according to the displacement of the touch operation, to perform the predetermined function when it is determined that there is a displacement of the touch operation in the first preset time interval, comprising:
        determining whether the displacement of the touch operation in the first preset time interval exceeds a displacement threshold in a first direction or a second direction;
        generating an operation signal corresponding to a first function of the electronic device when it is determined that the displacement of the touch operation exceeds the displacement threshold in the first direction, wherein the first function corresponds to a clockwise rotation operation of a radial controller;
        generating an operation signal corresponding to a second function of the electronic device when it is determined that the displacement of the touch operation exceeds the displacement threshold in the second direction, wherein the second function corresponds to a counterclockwise rotation operation of the radial controller;
        generating an operation signal corresponding to a third function of the electronic device when it is determined that the displacements of the touch operation do not exceed the displacement threshold in the first direction and the second direction, wherein the third function corresponds to a developer-defined function;
        generating an operation signal corresponding to a fourth function of the electronic device when it is determined that there is no displacement of the touch operation in the first preset time interval and the touch time does not exceed the second time threshold, wherein the fourth function corresponds to a short-press operation of the radial controller; and
        generating an operation signal corresponding to a fifth function of the electronic device when it is determined that there is no displacement of the touch operation in the first preset time interval and the touch time exceeds the second time threshold, wherein the fifth function corresponds to a long-press operation of the radial controller.

2. An electronic device, comprising:
    a touchpad;
    a storage device storing a computer module; and
    a processor, coupled to the touchpad and the storage device and configured to load and execute the computer module to implement the following steps:
        generating a touch signal in response to a touch operation performed on the touchpad;
        determining whether the touch operation is located in at least one predetermined region of the touchpad according to the touch signal;
        determining whether there is a displacement of the touch operation in a first preset time interval according to the touch signal when it is determined that the touch operation is located in the predetermined region; and
        generating an operation signal corresponding to a predetermined function of the electronic device to perform the predetermined function according to the displacement of the touch operation when it is determined that there is a displacement of the touch operation in the first preset time interval, wherein the processor is configured to:
    determine whether the displacement of the touch operation in the first preset time interval exceeds a displacement threshold in a first direction or a second direction;
    generate an operation signal corresponding to a first function of the electronic device when it is determined that the displacement of the touch operation exceeds the displacement threshold in the first direction, wherein the first function corresponds to a clockwise rotation operation of a radial controller;
    generate an operation signal corresponding to a second function of the electronic device when it is determined that the displacement of the touch operation exceeds the displacement threshold in the second direction, wherein the second function corresponds to a counterclockwise rotation operation of the radial controller;
    generate an operation signal corresponding to a third function of the electronic device when it is determined that the displacements of the touch operation do not exceed the displacement threshold in the first direction and the second direction, wherein the third function corresponds to a developer-defined function;
    generate an operation signal corresponding to a fourth function of the electronic device when it is determined that there is no displacement of the touch operation in the first preset time interval and the touch time does not exceed the second time threshold, wherein the fourth function corresponds to a short-press operation of the radial controller; and
    generate an operation signal corresponding to a fifth function of the electronic device when it is determined that there is no displacement of the touch operation in the first preset time interval and the touch time exceeds the second time threshold, wherein the fifth function corresponds to a long-press operation of the radial controller.

3. The electronic device according to claim 2, wherein
    the processor comprises a touchpad native driver module, a touchpad driver module, a radial controller native driver module, a radial controller driver module, and a human interface device category driver module;
    the touchpad driver module is in a signal connection to the touchpad native driver module and the human interface device category driver module, receives a touch signal detected by the touchpad by the human interface device category driver module, and transmits the touch signal to the touchpad native driver module, to perform a corresponding touchpad function;
    the radial controller driver module is in a signal connection to the radial controller native driver module and the human interface device category driver module, receives an operation signal detected by a radial controller by the human interface device category driver module, and transmits the operation signal to the radial controller native driver module, to perform a corresponding radial controller function; and the touchpad driver module generates, according to the touch signal, an operation signal corresponding to a predetermined function of the radial controller and transmits the operation signal to the radial controller driver module, and the radial controller driver module generates a function packet in a data format readable by the radial controller native driver module and transmits the function packet to the radial controller native driver module according to the operation signal, to simulate operation functions of the radial controller by the radial controller native driver module.

4. The electronic device according to claim 2, further comprising:

a screen, wherein the processor is further configured to: map a touch operation region of the touchpad to a corresponding stylus operation mapping region on the screen, to convert a touch operation of a stylus performed in the touch operation region into a corresponding operation performed at a corresponding position in the stylus operation mapping region.

5. The electronic device according to claim 4, wherein the processor comprises a touchpad native driver module, a touchpad driver module, a stylus native driver module, a stylus driver module, and a human interface device category driver module;

the touchpad driver module is in a signal connection to the touchpad native driver module and the human interface device category driver module, receives a touch signal detected by the touchpad by the human interface device category driver module, and transmits the touch signal to the touchpad native driver module, to perform a corresponding touchpad function;

the stylus driver module is in a signal connection to the stylus native driver module and the human interface device category driver module, receives an operation signal detected by the stylus by the human interface device category driver module, and transmits the operation signal to the stylus native driver module, to perform a corresponding stylus function; and the touchpad driver module generates an operation signal corresponding to an adjustment function of the operation region of the stylus and transmits the operation signal to the stylus driver module according to the touch signal, and the stylus driver module generates a function packet in a data format readable by the stylus native driver module and transmits the function packet to the stylus native driver module according to the operation signal, to simulate adjustment of the operation region of the stylus by using the stylus native driver module.

6. The electronic device according to claim 4, wherein the processor is configured to determine whether a displacement of the touch operation exceeds a second displacement threshold in a second preset time interval;

when it is determined that the displacement of the touch operation exceeds the second displacement threshold in the second preset time interval, move, according to a magnitude and a direction of the displacement, a position of the stylus operation mapping region mapped to the screen; and when it is determined that the displacement of the touch operation does not exceed the second displacement threshold in the second preset time interval, generate an operation signal corresponding to a sixth function of the electronic device, to perform the sixth function.

* * * * *